(12) United States Patent
Etayo et al.

(10) Patent No.: US 11,848,019 B2
(45) Date of Patent: Dec. 19, 2023

(54) PRIVATE SPEECH FILTERINGS

(71) Applicant: HEWLETT-PACKARD DEVELOPMENT COMPANY, L.P., Spring, TX (US)

(72) Inventors: Edward Etayo, Spring, TX (US); Alan Man Pan Tam, Spring, TX (US); Maureen A. Aragon, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 308 days.

(21) Appl. No.: 17/349,865

(22) Filed: Jun. 16, 2021

(65) Prior Publication Data

US 2022/0406315 A1 Dec. 22, 2022

(51) Int. Cl.
*G10L 17/26* (2013.01)
*G06F 3/01* (2006.01)
*G10L 25/90* (2013.01)
*G06N 20/00* (2019.01)
(Continued)

(52) U.S. Cl.
CPC .............. *G10L 17/26* (2013.01); *G06F 3/012* (2013.01); *G06F 3/017* (2013.01); *G06F 3/165* (2013.01); *G06N 3/045* (2023.01); *G06N 20/00* (2019.01); *G10L 25/90* (2013.01)

(58) Field of Classification Search
CPC .......... G06F 3/012; G06F 3/017; G06F 3/165; G06F 1/3265; G06F 3/011; G06F 40/35; G06N 3/0442; G06N 3/045; G06N 7/01; G06N 20/00; G06Q 40/03; G10L 17/26; G10L 21/0272; G10L 25/69; G10L 25/78; G10L 25/90; G10L 15/10; G10L 15/22; G10L 21/00; G10L 21/013; G10L 21/0308; G10L 25/00; G10L 25/48; H03G 3/342; H04N 21/8106; H04N 7/152; H04R 1/1041; H04R 3/00; B60W 50/10; G09B 5/04; H04L 65/4038; H04L 65/62; H04M 3/5175; H04S 7/302
See application file for complete search history.

(56) References Cited

U.S. PATENT DOCUMENTS 8,442,833 B2 * 5/2013 Chen ....................... G10L 25/78
704/270.1
8,719,032 B1 * 5/2014 Bader ................. G10L 21/0272
379/202.01
(Continued)

OTHER PUBLICATIONS

Zhang et al., "Advancements in Whisper-Island Detection Within Normally Phonated Audio Streams," Interspeech 2009 Brighton, Sep. 6-10, Brighton UK, pp. 860-863.
(Continued)

*Primary Examiner* — Gerald Gauthier
(74) *Attorney, Agent, or Firm* — Knobbe, Martens, Olson & Bear, LLP

(57) ABSTRACT

In some examples, an electronic device comprises an image sensor to detect a user action, an audio input device to receive an audio signal, and a processor coupled to the audio input device and the image sensor. The processor is to determine that the audio signal includes private speech based on the user action, remove the private speech from the audio signal to produce a filtered audio signal, and transmit the filtered audio signal.

15 Claims, 5 Drawing Sheets

(51) Int. Cl.
*G06F 3/16* (2006.01)
*G06N 3/045* (2023.01)

(56) References Cited

U.S. PATENT DOCUMENTS

| | | | | |
|---|---|---|---|---|
| 8,719,035 B2* | 5/2014 | Stewart | G10L 17/26 |
| | | | 704/235 |
| 8,831,953 B2* | 9/2014 | Vanjani | H04N 21/8106 |
| | | | 704/9 |
| 9,031,293 B2* | 5/2015 | Kalinli-Akbacak | G06F 3/011 |
| | | | 382/128 |
| 9,037,468 B2* | 5/2015 | Osman | H04S 7/302 |
| | | | 704/270 |
| 9,043,211 B2* | 5/2015 | Haiut | G06F 1/3265 |
| | | | 704/251 |
| 9,224,387 B1 | 12/2015 | Slifka | |
| 10,776,073 B2* | 9/2020 | Lenke | H04N 7/152 |
| 11,706,568 B2* | 7/2023 | Shah | H04L 65/762 |
| | | | 704/270 |
| 11,710,495 B2* | 7/2023 | Marcinkiewicz | H04R 3/00 |
| | | | 704/270 |
| 11,721,347 B1 | 8/2023 | Pasko | G10L 17/26 |
| | | | 704/270 |
| 11,749,274 B2* | 9/2023 | Cohen | G06F 40/35 |
| | | | 704/270 |
| 11,758,346 B2* | 9/2023 | Osman | H04S 7/302 |
| | | | 381/303 |
| 2004/0083107 A1* | 4/2004 | Noda | G10L 15/22 |
| | | | 704/E15.04 |
| 2006/0085183 A1 | 4/2006 | Jain | |
| 2007/0198268 A1* | 8/2007 | Hennecke | G10L 15/22 |
| | | | 704/E15.04 |
| 2008/0235016 A1* | 9/2008 | Paul | G10L 25/78 |
| | | | 704/E17.012 |
| 2008/0249779 A1* | 10/2008 | Hennecke | G10L 15/22 |
| | | | 704/E15.04 |
| 2009/0055190 A1* | 2/2009 | Filev | G06T 13/205 |
| | | | 704/270 |
| 2009/0063146 A1* | 3/2009 | Yoshioka | G10L 17/26 |
| | | | 704/250 |
| 2009/0299750 A1* | 12/2009 | Yonekubo | G10L 25/78 |
| | | | 704/E19.001 |
| 2010/0211394 A1* | 8/2010 | Nazdratenko | G10L 17/26 |
| | | | 704/E21.001 |
| 2011/0071837 A1* | 3/2011 | Yonekubo | G10L 21/00 |
| | | | 704/E21.001 |
| 2011/0093273 A1* | 4/2011 | Lee | H04L 65/4038 |
| | | | 348/E7.083 |
| 2011/0251845 A1* | 10/2011 | Arakawa | G10L 25/78 |
| | | | 704/E21.001 |
| 2011/0295607 A1* | 12/2011 | Krishnan | G10L 17/26 |
| | | | 704/E11.001 |
| 2011/0313773 A1* | 12/2011 | Yamada | G10L 17/26 |
| | | | 704/E11.001 |
| 2012/0259638 A1* | 10/2012 | Kalinli | G10L 25/78 |
| | | | 704/E11.001 |
| 2013/0013316 A1* | 1/2013 | Burke | G10L 15/10 |
| | | | 704/270 |
| 2013/0096922 A1* | 4/2013 | Asaei | G10L 21/0308 |
| | | | 704/E11.001 |
| 2015/0064666 A1* | 3/2015 | Song | G09B 5/04 |
| | | | 434/185 |
| 2015/0142446 A1* | 5/2015 | Gopinathan | G06Q 40/03 |
| | | | 705/38 |
| 2015/0179187 A1* | 6/2015 | Xiao | G10L 25/69 |
| | | | 704/270 |
| 2015/0235655 A1* | 8/2015 | Dimitriadis | G10L 25/48 |
| | | | 704/270 |
| 2015/0302867 A1* | 10/2015 | Tomlin | G10L 25/78 |
| | | | 704/270 |
| 2016/0117684 A1* | 4/2016 | Khor | H04M 3/5175 |
| | | | 704/270 |
| 2017/0358301 A1 | 12/2017 | Raitio et al. | |
| 2018/0137880 A1 | 5/2018 | Wenndt et al. | |
| 2019/0037076 A1 | 1/2019 | Klein et al. | |
| 2021/0217431 A1* | 7/2021 | Pearson | G10L 21/013 |
| 2022/0116707 A1* | 4/2022 | Zyskowski | H04R 1/1041 |
| 2022/0214859 A1* | 7/2022 | El Ghazzal | H03G 3/342 |
| 2022/0406315 A1* | 12/2022 | Etayo | G06N 3/045 |

OTHER PUBLICATIONS

Raeesy et al., "LSTM-Based Whisper Detection," SLT 2018, pp. 139-144.
Naini et al., "Whisper Activity Detection Using CNN-LSTM Based Attention Pooling Network Trained for a Speaker Identification Task," 5 p.
Sak et al., "Long-Short Term Memory Recurrent Neural Network Architectures for Large Scale Acoustic Modeling," Google, USA, 5 p.
Ashihara et al., "Neural Whispered Speech Detection with Imbalanced Learning," Interspeech 2019, Sep. 15-19, 2019, Graz, Austria, pp. 3352-3356.

* cited by examiner

PRIVATE SPEECH FILTERINGS

BACKGROUND

Electronic devices such as desktops, laptops, notebooks, tablets, and smartphones include audio input devices (e.g., microphones or any other suitable devices for recording sounds). An audio input device detects sound in an environment of an electronic device. A user may utilize an audio input device while engaging with an audience of an application (e.g., executable code, or machine-readable instructions that enable videoconferencing, video messaging, or video recording).

BRIEF DESCRIPTION OF THE DRAWINGS

Various examples are described below referring to the following figures.

DETAILED DESCRIPTION

Figure 1:
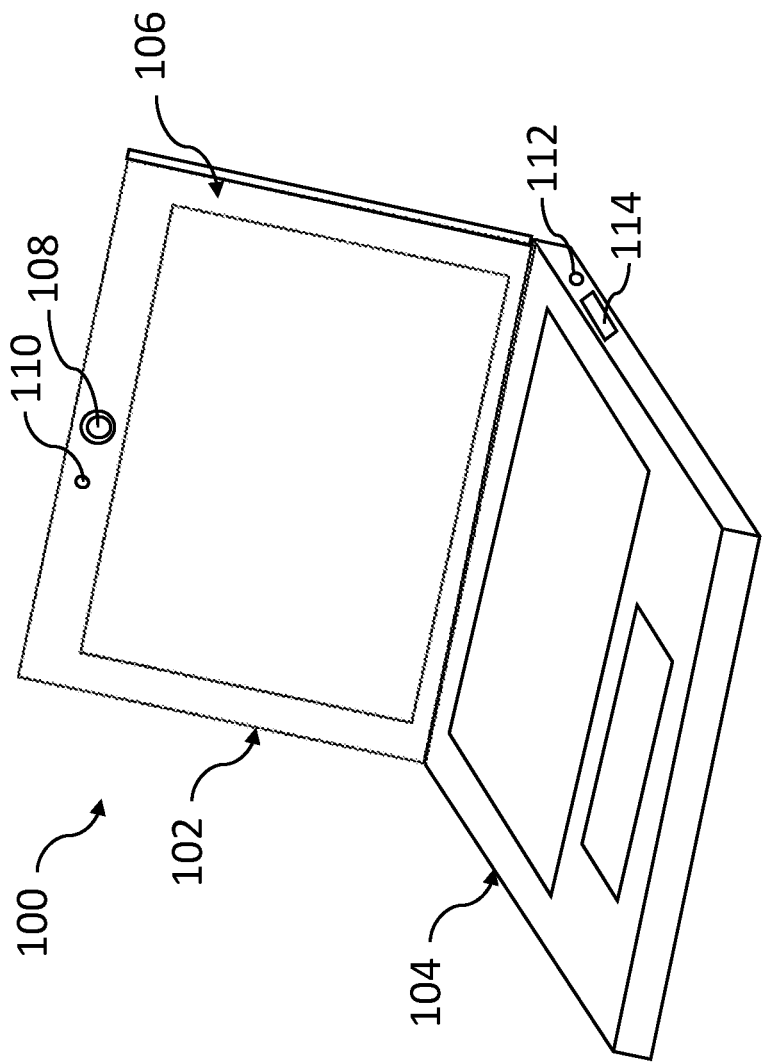
FIG. 1 is a schematic diagram of an electronic device for filtering private speech from audio signals in accordance with various examples.
Figure 1:
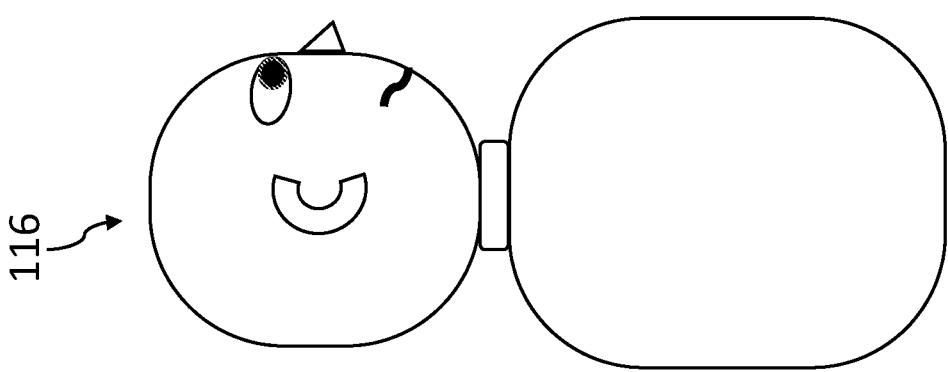

As described above, electronic devices include audio input devices that detect sounds in an environment, or the area in which the electronic device is utilized. The sounds are recorded as audio signals. Because the audio input device detects sound in the environment, an audio signal may include the user's speech as well as background noises (e.g., a barking dog, a ringing phone). In some instances, the user may emit a sound (e.g., private speech) without intending an audience to hear the private speech (e.g., a whisper to another person in the environment, a word to quiet the barking dog, a cough, a sneeze). The transmission of the audio signal including private speech diminishes the user's experience and the audience's experience.

This description describes examples of an electronic device that removes private speech from an audio signal. The private speech is sound or speech the user may emit without intending the audience to hear. Normal speech is sound or speech the user intends the audience to hear. The electronic device may determine that the audio signal includes private speech in response to a command. The command may be a user action detected by an image sensor (e.g., a user's hand gesture, a user's head movement) or may be a verbalization detected by an audio input device. In some examples, the electronic device may mute the audio input device in response to the command. Prior to transmitting the audio signal, the electronic device may identify a portion of the audio signal that corresponds to private speech. In some examples, the electronic device may utilize a machine learning technique (e.g., long-short term memory (LSTM) neural network, imbalanced learning, Deep Belief Networks (DBNs)), or a combination thereof) to identify the portion of the audio signal that corresponds to private speech. The electronic device removes the private speech from the audio signal to produce a filtered audio signal and then transmits the filtered audio signal.

By removing private speech from an audio signal, the user's experience is improved because the user does not need to locate an interface of the audio input device to mute the audio input device prior to emitting the private speech. The user's experience is also improved because the private speech is not transmitted. The audience's experience is improved because the private speech is not received to disrupt the videoconferencing, video messaging, or video recording.

In an example in accordance with the present description, an electronic device is provided. The electronic device comprises an image sensor to detect a user action, an audio input device to receive an audio signal, and a processor coupled to the audio input device and the image sensor. The processor is to determine that the audio signal includes private speech based on the user action, remove the private speech from the audio signal to produce a filtered audio signal, and transmit the filtered audio signal.

In another example in accordance with the present description, an electronic device is provided. The electronic device comprises an audio input device to receive an audio signal and a processor coupled to the audio input device. The processor is to receive a command to mute the audio input device, cause the audio input device to be muted based on the command, identify a portion of the audio signal that corresponds to private speech based on the command, remove the private speech from the audio signal to produce a filtered audio signal, and transmit the filtered audio signal.

In another example in accordance with the present description, a non-transitory machine-readable medium is provided. The non-transitory machine-readable medium stores machine-readable instructions. When executed by a processor of an electronic device, the machine-readable instructions cause the processor to detect a user action via an image sensor, receive an audio signal detected via an audio input device, and determine that the audio signal includes private speech via a machine learning technique, where the detected user action is an input to the machine learning technique. When executed by a processor of an electronic device, the machine-readable instructions cause the processor to remove the private speech from the audio signal to produce a filtered audio signal and transmit the filtered audio signal.

Referring now to FIG. 1, a schematic diagram of an electronic device 100 for filtering private speech from audio signals is depicted in accordance with various examples. The electronic device 100 comprises a display device 102, a chassis 104, a bezel 106, an image sensor 108, an audio input device 110, and connectors 112, 114. The electronic device 100 may be a desktop, a laptop, a notebook, a tablet, a smartphone, or other electronic computing device that includes an audio input device 110, an image sensor 108, or a combination thereof. The display device 102 may be any suitable display device for displaying data generated by the electronic device 100. The chassis 104 may house internal hardware components of the electronic device 100 (e.g., storage devices, processors, communication buses, power supplies, fans) and may comprise the connectors 112, 114. The connectors 112, 114 may be any suitable connector to which an audio input device (e.g., external microphone, headset, or any other suitable device for recording sound) or an image sensor (e.g., an external camera or any other suitable device for recording images) may couple. For example the connector 112 may be an audio jack and the connector 114 may be a universal serial bus (USB) connector. The bezel 106 may secure a display panel within a chassis of the display device 102 and may comprise the audio input device 110 and the image sensor 108. The image sensor 108 may be an internal camera, for example. The audio input device 110 may be an internal microphone, for example. A user 116 may interact with the electronic device 100 to record sounds utilizing the audio input device 110 or an audio input device coupled to the connector 112, 114 or to record images utilizing the image sensor 108 or an image sensor coupled to the connector 112, 114.

As described above, in various examples, the electronic device 100 removes private speech from an audio signal recorded by the audio input device 110 or by the audio input device coupled to the connector 112, 114. The electronic device 100 may determine that the audio signal includes private speech in response to a command. The command may be an action performed by the user 116 (e.g., user action). The user action may be a hand gesture or a head movement detected by the image sensor 108 or by the image sensor coupled to the connector 112, 114. The user action may be a verbalization (e.g., "Mute, please.", "Pause, please.", "Privacy, please.") spoken by the user 116. The verbalization may be detected by the audio input device 110 or by the audio input device coupled to the connector 112, 114. In some examples, the user action may be a hand gesture, a head movement, a verbalization, or a combination thereof.

In some examples, the electronic device 100 may mute the audio input device 110 or the audio input device coupled to the connector 112, 114 in response to the command. Prior to transmitting the audio signal, the electronic device 100 may identify a portion of the audio signal that corresponds to private speech. In various examples, responsive to the command comprising a verbalization, the electronic device 100 identifies the verbalization as the portion of the audio signal that corresponds to private speech. In various examples, the electronic device 100 identifies the verbalization and another portion of the audio signal as corresponding to private speech. The electronic device 100 may utilize a machine learning technique to identify the another portion of the audio signal that corresponds to private speech, as described below with respect to FIG. 4. The electronic device 100 removes the private speech from the audio signal and then transmits the audio signal. Refer to FIG. 5 below for an example of the electronic device 100 filtering the private speech from the audio signal.

By removing private speech from an audio signal, the experience of the user 116 is improved. Prior to emitting the private speech, the user 116 does not need to locate an interface of the audio input device 110 or the audio input device coupled to the connector 112, 114 to mute the audio input device 110 or to mute the audio input device coupled to the connector 112, 114. The experience of the user 116 is also improved because the private speech, which is not intended for an audience, is not transmitted. The audience's experience is improved because the private speech is not received to disrupt the videoconference, video messaging, or video recording.

Figure 2:
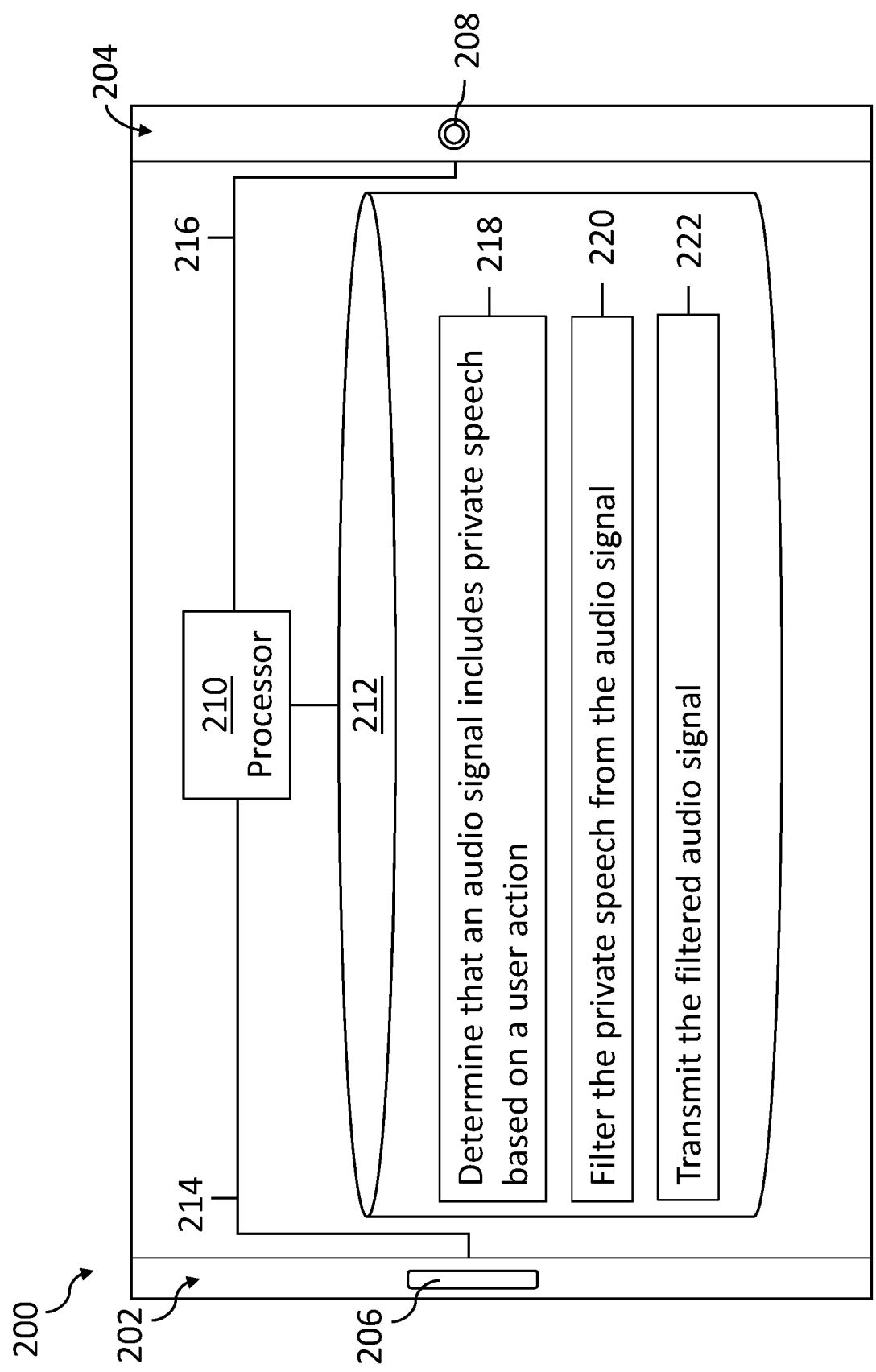
FIG. 2 is a schematic diagram of an electronic device for filtering private speech from audio signals in accordance with various examples.

Referring now to FIG. 2, a schematic diagram of an electronic device 200 for filtering private speech from audio signals is depicted in accordance with various examples. The electronic device 200 may be the electronic device 100. The electronic device 200 comprises bezels 202, 204, an audio input device 206, an image sensor 208, a processor 210, a storage device 212, and communication buses 214, 216. The bezels 202, 204 may secure a display panel of the electronic device 200. The bezel 202 comprises the audio input device 206. The bezel 204 comprises the image sensor 208. The bezel 202, 204 may be the bezel 106. The audio input device 206 may be the audio input device 110. The image sensor 208 may be the image sensor 108. The processor 210 may be a microprocessor, a microcomputer, a microcontroller, a programmable integrated circuit, a programmable gate array, or other suitable device for controlling operations of the electronic device 200. The storage device 212 may be a hard drive, a solid-state drive (SSD), flash memory, random access memory (RAM), or other suitable memory device. The communication buses 214, 216 enable data transfers between components coupled to the communication buses 214, 216.

In some examples, the processor 210 couples to the storage device 212, the audio input device 206 via the communication bus 214, and the image sensor 208 via the communication bus 216. The storage device 212 may store machine-readable instructions that, when executed by the processor 210, may cause the processor 210 to perform some or all of the actions attributed herein to the processor 210. The machine-readable instructions may be the machine-readable instructions 218, 220, 222.

In various examples, when executed by the processor 210, the machine-readable instructions 218, 220, 222 cause the processor 210 to filter private speech from an audio signal recorded. The audio signal may be recorded by the audio input device 206. As described above with respect to FIG. 1, the image sensor 208 may detect a user action. For example, the image sensor 208 may detect a user (e.g., the user 116) hand gesture such as the user covering her mouth, covering the audio input device 206, or covering the image sensor 208. In another example, the image sensor 208 may detect a user head movement such as the user turning her head away from the image sensor 208. The machine-readable instruction 218 causes the processor 210 to determine that the audio signal includes private speech based on the user action. For example, the processor 210 may determine that the user covering her mouth, covering the audio input device 206, covering the image sensor 208, or turning her head away from the image sensor 208 indicates that a first portion of the audio signal preceding the user action and a second portion of the audio signal recorded after the user action may include private speech. The machine-readable instruction 220 causes the processor 210 to filter the private speech from the audio signal. For example, the processor 210 may determine that the first portion of the audio signal recorded preceding the user action is normal speech but that the second portion of the audio signal recorded after the user action is private speech. Refer to FIG. 5 below for an example of the electronic device 200 filtering the private speech from the audio signal. The machine-readable instruction 220 causes the processor 210 to transmit the filtered audio signal.

In various examples, the first portion of the audio signal may include a fixed time period of the audio signal preceding the user action. For example, the first portion of the audio signal may include a 10 second (sec.) time period immediately preceding the user action. In other examples, the time period of the first portion may be a variable time period determined by utilizing a machine learning technique as described below with respect to FIG. 4. In various examples, the second portion of the audio signal may include a fixed time period of the audio signal following the user action. For example, the second portion of the audio signal may include a 30 sec. time period immediately following the user action. In other examples, the user action is a first user action and a duration of the time period of the second portion may be based on a time elapsed between the first user action and a second user action, where the second user action indicates that the audio signal includes normal speech. In some examples, the time period of the second portion may be a variable time period determined by utilizing a machine learning technique as described below with respect to FIG. 4. In various examples, the processor 210 may determine that the first portion of the audio signal recorded preceding the user action is normal speech and that the second portion of the audio signal recorded after the user action is private speech by comparing an amplitude (e.g., power level) of the first portion to the amplitude of the second portion.

In some examples, the processor 210 may determine whether the first or the second portions of the audio signal comprise private speech by comparing an amplitude of the first or the second portion, respectively, to a threshold to determine whether the user is whispering. The processor 210 may determine whether an amplitude of the first or the second portion, respectively, of the audio signal is below a threshold (e.g., 30 decibels (dB)) that indicates whispering. For example, responsive to a determination that the amplitude of the first portion is 45 dBs and the amplitude of the second portion of the audio signal is 26 dBs, the processor 210 may determine the first portion comprises normal speech and the second portion comprises private speech that is whispering. In some examples, the processor 210 may filter the second portion from the audio signal prior to transmission. In other examples, the processor 210 may filter the whispering of the second portion from the audio signal prior to transmission.

In various examples, the processor 210 may analyze the whispering to determine whether the user intends the audience to hear the whispering. For example, the processor 210 may utilize measurements taken by the image sensor 208. The processor 210 may determine a first distance between the user and the electronic device 200 that is associated with the first portion of the audio signal. The processor 210 may determine a second distance between the user and the electronic device 200 that is associated with the second portion of the audio signal. The processor 210 may compare the first distance to the second distance. The processor 210 may compare a first amplitude of the first portion to a second amplitude of the second portion. The processor 210 may determine a proportional relationship of the first amplitude to the first distance and of the second amplitude to the second distance. The proportional relationship may indicate whether the first portion, the second portion, or both the first and the second portions comprise private speech.

For example, the processor 210 may determine that the proportion of the first distance and the first amplitude compared to the proportion of the second distance and the second amplitude indicates that the user is increasing her distance from the electronic device 200 while maintaining a volume level. Based on the determination, the processor 210 may determine the first and the second portions comprise normal speech. In another example, the processor 210 may determine that the proportion of the first distance and the first amplitude compared to the proportion of the second distance and the second amplitude indicate that the user is decreasing her distance from the electronic device 200 and decreasing the volume level. Responsive to the determination, the processor 210 may determine the first and the second portions comprise private speech. In another example, the processor 210 may determine that the proportion of the first distance and the first amplitude compared to the proportion of the second distance and the second amplitude indicates that the user is increasing her distance from the electronic device 200 while decreasing a volume level. Based on the determination, the processor 210 may determine the first portion comprises normal speech and the second portion comprises private speech. In various examples, the processor 210 may analyze the whispering to determine whether the user intends the audience to hear the whispering utilizing a machine learning technique as described below with respect to FIG. 4.

In various examples, to determine if the audio signal comprises private speech as indicated by the user action, the processor 210 may utilize a change point detection technique to detect changes in the audio signal. The changes may be changes in amplitude or frequency, for example. The processor 210 may analyze frequency differences in portions of the audio signal, patterns of energy concentration across the audio signal, differences between energy concentration patterns of the audio signal and the energy concentration patterns of normal speech, differences between energy concentration patterns of the audio signal and energy concentration patterns of background noise, or a combination thereof. The energy concentration patterns may be measures of amplitudes over a time period or frequency over the time period. For example, the processor 210 may compare the amplitude of the first portion to an amplitude of another portion of the audio signal preceding the first portion and an amplitude of the second portion to an amplitude of yet another portion of the audio signal that follows the second portion. Responsive to slight variations (e.g., amplitudes of 10 dBs above or below the amplitudes of the first or the second portion, respectively) of the amplitudes of the first portion and the portion of the audio signal preceding the first portion and of the amplitudes of the second portion and the portion of the audio signal that follows the second portion, the processor 210 may determine whether the first or the second portions comprise private speech or normal speech. For example, responsive to the amplitude of the portion of the audio signal that precedes the first portion having a value that is 5 dBs above the amplitude of the first portion, the processor 210 may determine the first portion comprises normal speech. Responsive to the amplitude of the portion of the audio signal that follows the second portion having a value that is 30 dB above the amplitude of the second portion, the processor 210 may determine the second portion comprises private speech and filter the second portion from the audio signal prior to transmission of the audio signal. By determining whether the user is whispering and whether the whispering is intended for the audience, the user's experience is improved because whispering that is private speech is not transmitted. The audience's experience is improved because the private speech is not received to disrupt the videoconference, the video messaging, or the video recording.

Figure 3:
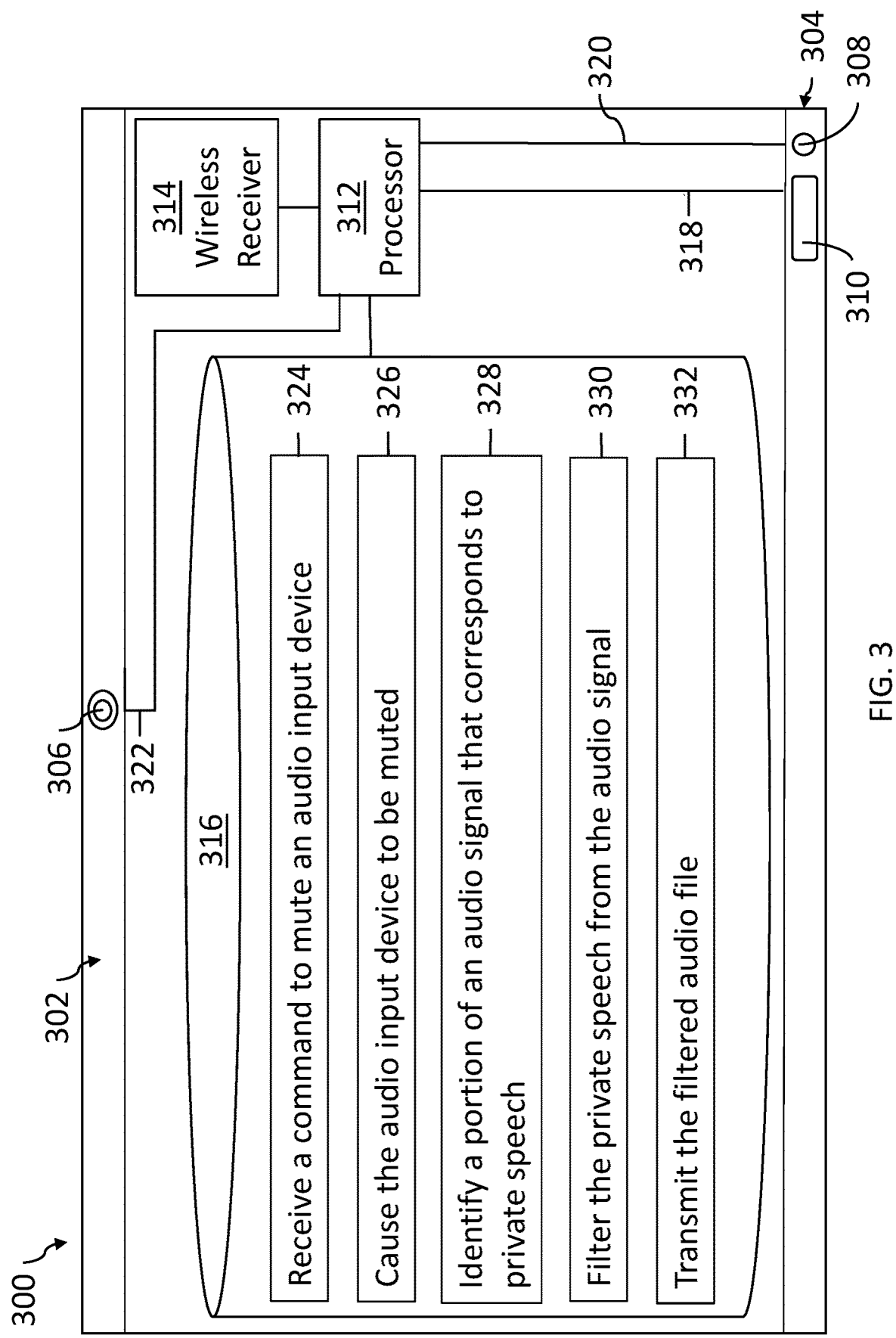
FIG. 3 is a schematic diagram of an electronic device for filtering private speech from audio signals in accordance with various examples.

Referring now to FIG. 3, a schematic diagram of an electronic device 300 for filtering private speech from audio signals is depicted in accordance with various examples. The electronic device 300 may be the electronic device 100, 200. The electronic device 300 comprises a bezel 302, a chassis 304, an image sensor 306, connectors 308, 310, a processor 312, a wireless receiver 314, a storage device 316, and communication buses 318, 320, 322. The bezel 302 includes the image sensor 306. The bezel 302 may be the bezel 106, 204. The image sensor 306 may be the image sensor 108, 208. The chassis 304 includes the connectors 308, 310. The chassis 304 may be the chassis 104. The connectors 308, 310 may be the connectors 112, 114. The processor 312 may be the processor 210. The storage device 316 may be the storage device 212. The wireless receiver 314 may enable an external audio input device or an external image sensor to wirelessly couple to the electronic device 300. The wireless receiver 314 may be a Wi-Fi® receiver, a Bluetooth® receiver, or any other suitable wireless receiver for receiving audio or video inputs. The communication buses 318, 320, 322 enable data transfers between components coupled to the communication buses 318, 320, 322.

In some examples, the processor 312 couples to the image sensor 306 via the communication bus 322, the connectors 308, 310 via the communication buses 320, 318, respectively, the wireless receiver 314, and the storage device 316. The storage device 316 may store machine-readable instructions that, when executed by the processor 312, may cause the processor 312 to perform some or all of the actions attributed herein to the processor 312. The machine-readable instructions may be the machine-readable instructions 324, 326, 328, 330, 332.

In various examples, when executed by the processor 312, the machine-readable instructions 324, 326, 328, 330, 332 cause the processor 312 to identify and filter private speech from an audio signal. The machine-readable instruction 324 causes the processor 312 to receive a command to mute an audio input device. The audio input device may be coupled to the electronic device 300 via the connector 308, 310 or to the wireless receiver 314. As described above with respect to FIGS. 1 and 2, the command may be a user action detected by the image sensor 306 or by an external image sensor coupled to the connector 308, 310 or to the wireless receiver 314. The command may be a verbalization detected by the audio input device. The machine-readable instruction 326 causes the processor 312 to cause the audio input device to be muted. For example, based on the command to mute the audio input device, the processor 312 may cause the audio input device coupled to the electronic device 300 via the connector 308, 310 or to the wireless receiver 314 to be muted. The machine-readable instruction 328 causes the processor 312 to identify a portion of an audio signal that corresponds to private speech. For example, based on the command to mute the audio input device, the processor 312 may analyze a first portion of the audio signal preceding the receipt of the command and a second portion of the audio signal following the receipt of the command and preceding the muting of the audio input device to identify whether the first portion, the second portion, or a combination thereof corresponds to private speech, as described above with respect to FIG. 2. In some examples, the processor 312 may analyze the first and the second portions utilizing the techniques described above with respect to FIG. 2. In other examples, the processor 312 may utilize a machine learning technique as described below with respect to FIG. 4. The machine-readable instruction 330 causes the processor 312 to filter the private speech from the audio signal. Refer to FIG. 5 below for an example of the electronic device 300 filtering the private speech from the audio signal. The machine-readable instruction 332 causes the processor 312 to transmit the filtered audio file.

In some examples, the processor 312 may receive a command to unmute the audio input device. The command may be a second user action that is different from the user action that indicated the command to mute the audio input device. For example, the command to mute may be a first user gesture (e.g., the user placing her finger against her lips) and the command to unmute may be a second user gesture (e.g., the user indicating "okay" with her fingers) that is different than the first user gesture. In another example, the command to mute may be a user gesture (e.g., the user holding her throat) and the command to unmute may be a verbalization (e.g., "Resume recording."). In yet another example, the command to mute may be a verbalization (e.g., "Pause recording.") and the command to unmute may be a user gesture (e.g., the user drawing a circle in the air with her finger). The processor 312 may unmute the audio device based on the command.

By muting and unmuting the audio input device responsive to the user's commands, the user's experience is improved because the user can mute and unmute without needing to locate an interface of the audio input device prior to emitting the private speech. The audience's experience is improved because the private speech is not received.

Figure 4:
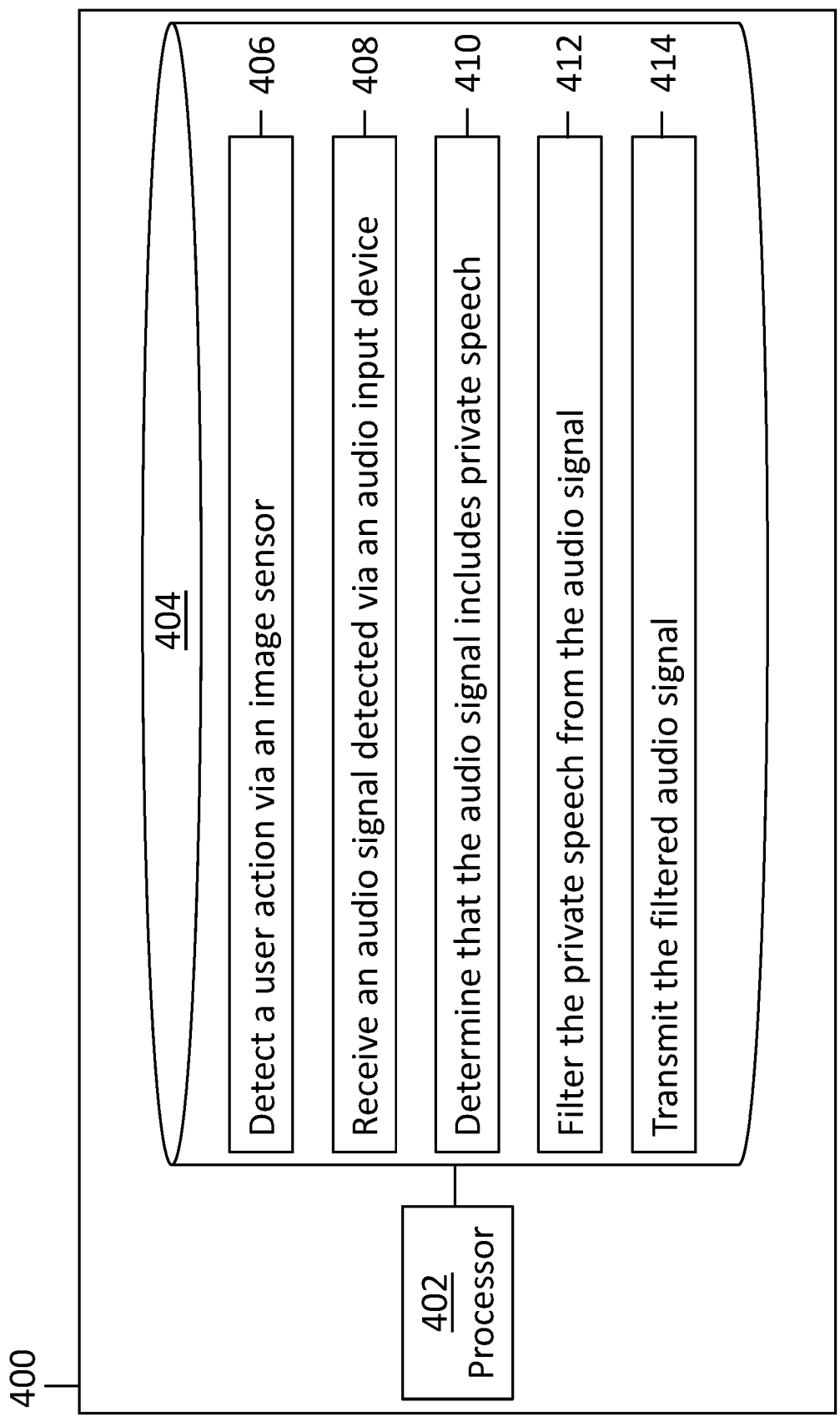
FIG. 4 is a schematic diagram of an electronic device for filtering private speech from audio signals in accordance with various examples.
Figure 5:
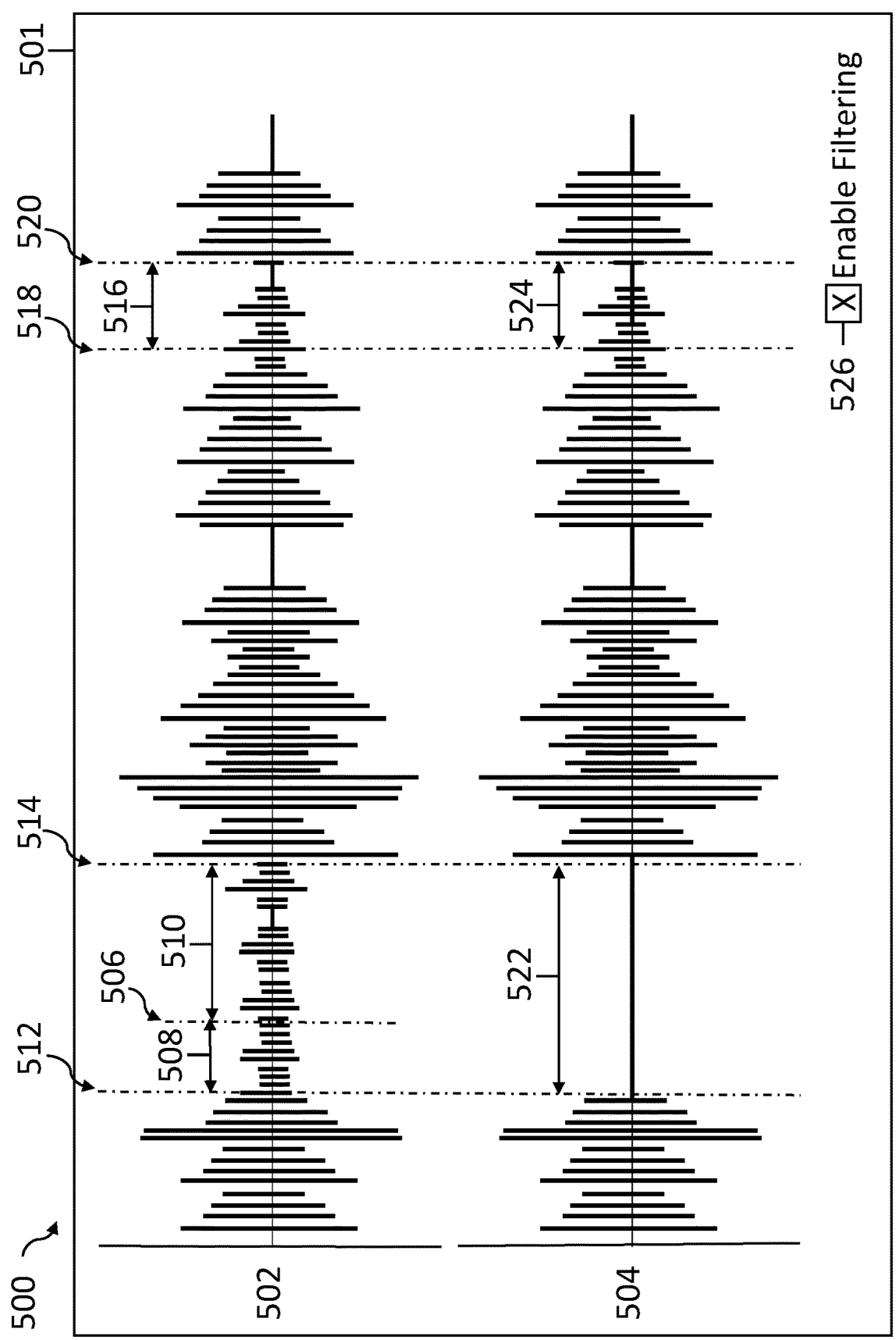
FIG. 5 is a diagram of an application window for filtering private speech from audio signals in accordance with various examples.

Referring now to FIG. 4, a schematic diagram of an electronic device 400 for filtering private speech from audio signals is depicted in accordance with various examples. The electronic device 400 may be the electronic device 300, 200, 100. The electronic device 400 comprises the processor 402 and the non-transitory machine-readable medium 404. The non-transitory machine-readable medium 404 may be the storage device 212, 316. The term "non-transitory" does not encompass transitory propagating signals.

In various examples, the electronic device 400 comprises the processor 402 coupled to the non-transitory machine-readable medium 404. The non-transitory machine-readable medium 404 may store machine-readable instructions. The machine-readable instructions may be the machine-readable instructions 406, 408, 410, 412, 414. The machine-readable instructions 406, 408, 410, 412, 414 when executed by the processor 402, may cause the processor 402 to perform some or all of the actions attributed herein to processor 402.

In various examples, when executed by the processor 402, the machine-readable instructions 406, 408, 410, 412, 414 cause the processor 402 to filter private speech from an audio signal. The machine-readable instruction 406 may cause the processor 402 to detect a user action via an image sensor. The image sensor may be the image sensor 108, 208, 306, an image sensor coupled to the connector 112, 114, 308, 310, or an image sensor coupled to the wireless receiver 314. The machine-readable instruction 408 may cause the processor 402 to receive an audio signal detected via an audio input device. The audio input device may be the audio input device 110, 206, an audio input device coupled to the connector 112, 114, 308, 310, or an audio input device coupled to the wireless receiver 314. The machine-readable instruction 410 may cause the processor 402 to determine that the audio signal includes private speech. For example, the processor 402 may determine the audio signal includes private speech utilizing the techniques described above with respect to FIGS. 1 and 2. The machine-readable instruction 412 may cause the processor 402 to filter the private speech from the audio signal. Refer to FIG. 5 below for an example of the electronic device 400 filtering the private speech from the audio signal. The machine-readable instruction 414 may cause the processor 402 to transmit the filtered audio signal.

In some examples, the processor 402 may determine that the audio signal includes private speech via a machine learning technique, where the detected user action (e.g., an action by the user 116) is an input to the machine learning technique. For example, the processor 402 may utilize a long-short term memory (LSTM) neural network, imbalanced learning, Deep Belief Networks (DBNs), or a combination thereof to analyze the user action and the audio signal. For example, the processor 402 may utilize the machine learning technique to analyze frequency differences in portions of the audio signal, patterns of energy concentration across the audio signal, differences between energy concentration patterns of the audio signal and the energy concentration patterns of normal speech, differences between energy concentration patterns of the audio signal and energy concentration patterns of background noise, or a combination thereof.

As described above with respect to FIGS. 1 and 2, the user action may be a user gesture (e.g., the user covering her mouth, covering the audio input device, or covering the image sensor, the user turning her head away from the image sensor) or a verbalization (e.g., "Mute, please.", "Pause, please.", "Privacy, please."). The processor 402 may determine that the user action is a command that indicates the audio signal comprises private speech based on a comparison of the user action to data of previous user actions that indicated that a previous audio signal comprised private speech, for example. The data may be stored on the non-transitory machine-readable medium 404. In another example, the processor 402 may determine that a verbalization is the command based on the content of the verbalization. In other examples, the processor 402 may determine that the user action is the command by analyzing a first portion of the audio signal preceding the user action and a second portion of the audio signal following the user action.

For example, the processor 402 may analyze the first portion to identify high frequencies (e.g., frequencies above 2000 Hertz) associated with background noises such as whistling or screaming. Responsive to identifying a high frequency, the processor 402 may compare the energy concentration patterns of the first portion to patterns of background noise. The patterns of background noise may be stored on the non-transitory machine-readable medium 404. Responsive to identifying the first portion as background noise, the processor 402 may determine that the user action was a command that indicates the audio signal comprises private speech. In some examples, the processor 402 may determine the energy concentration patterns of the first portion indicate private speech. In some examples, the processor 402 may store the energy concentration patterns of the first portion as a sample of the user's private speech on the non-transitory machine-readable medium 404. The processor 402 may filter the first portion from the audio signal.

As described above with respect to FIG. 2, in some examples, the processor 402 may determine that a duration of the first portion is a time period for analyzing first portions of future audio signals comprising private speech. The processor 402 may store the time period on the non-transitory machine-readable medium 404. In various examples, the processor 402 may store multiple time periods on the non-transitory machine-readable medium 404, where a time period of the multiple time periods is associated with a different energy concentration pattern associated with a first portion of an audio signal comprising private speech.

In another example, the processor 402 may compare energy concentration patterns of the second portion to energy concentration patterns of normal speech. The energy concentration patterns of normal speech may be energy concentration patterns of the user's normal speech. The energy concentration patterns of normal speech may be stored on the non-transitory machine-readable medium 404. Based on a determination that the energy concentration patterns of the second portion are different than the energy concentration patterns of normal speech, the processor 402 may determine that the user action was a command that indicates the audio signal comprises private speech. In some examples, the processor 402 may determine the energy concentration patterns of the second portion indicate private speech. The processor 402 may store the energy concentration patterns of the second portion as a sample of the user's private speech on the non-transitory machine-readable medium 404. The processor 402 may filter the second portion from the audio signal.

As described above with respect to FIG. 2, in some examples, the processor 402 may determine that a duration of the second portion is a time period for analyzing second portions of future audio signals comprising private speech. The processor 402 may store the time period on the non-transitory machine-readable medium 404. In various examples, the processor 402 may store multiple time periods on the non-transitory machine-readable medium 404, where a time period of the multiple time periods is associated with a different energy concentration pattern associated with a second portion of an audio signal comprising private speech. The processor 402 may filter the second portion from the audio signal.

As described above with respect to FIG. 4, in various examples, the processor 402 may utilize a machine learning technique to identify another portion of the audio signal that corresponds to private speech. For example, the processor 402 may analyze the audio signal for low frequencies that may indicate whispering. As described above with respect to FIG. 4, the processor 402 may determine whether the user intends the audience to hear the whispering. For example, the processor 402 may analyze energy concentration patterns of the audio signal and determine that energy concentration patterns of background noise overlap energy concentration patterns of the user's normal speech. The processor 402 may determine that the user is in a noisy environment and intending to whisper to maintain a level of privacy with the audience. In another example, the processor 402 may analyze energy concentration patterns of the audio signal and determine that energy concentration patterns of background whispering precede the user's whisper. The processor 402 may determine that the user is engaging in a whispered conversation with someone other than the audience. The processor 402 may determine that the whispered conversation is private speech and filter the whispered conversation from the audio signal. In some examples, the processor 402 may mute the audio input device for a duration of the whispered conversation.

By utilizing a machine learning technique to identify private speech of an audio signal, the user's experience is improved because the user does not need to locate an interface of the audio input device to mute the audio input device prior to emitting the private speech. By analyzing the audio signal via the machine learning technique, the user's experience is also improved because the private speech is not transmitted and the processor 402 is better trained to identify private speech in future audio signals without a user action. The audience's experience is improved because the private speech is not received to disrupt the videoconference, video messaging, or video recording.

Referring now to FIG. 5, a diagram of an application window 501 for filtering private speech from audio signals is depicted in accordance with various examples. FIG. 5 includes the electronic device 500 and the application window 501. The electronic device 500 may be the electronic device 100, 200, 300, 400. The application window 501 may be an application window for a private speech filtering application of a graphical user interface (GUI). The application window 501 may be displayed on a display device 102. The application window 501 comprises audio signals 502, 504 that include time indicators 506, 512, 514, 518, 520 and an enable filtering box 526. The audio signal 502 includes portions 508, 510, 516. The audio signal 504 includes portions 522, 524. The audio signal 504 is the audio signal 502 after filtering. The enable filtering box 526 may be a button, radio box, check box, or any other suitable GUI that allows a user to enable or disable the private speech filtering application.

In some examples, a processor (e.g., the processor 210, 312, 402) identifies portions 508, 510 of the audio signal 502 as including private speech. The processor may identify the portions 508, 510 in response to a command. For example, an image sensor (e.g., the image sensor 108, 208, 306, an image sensor coupled to the connector 112, 114, 308, 310, an image sensor coupled to the wireless receiver 314) may detect a user's gesture such as a hand gesture or a head movement. In another example, an audio input device (e.g., the audio input device 110, 206, an audio input device coupled to the connector 112, 114, 308, 310, an audio input device coupled to the wireless receiver 314) may detect a verbalization. The command may occur at the time indicator 506. Prior to transmitting the audio signal 502, the processor may identify that the portions 508, 510 correspond to private speech. The processor removes the portions 508, 510 as indicated by the filtered portion 522 of the audio signal 504. The audio signal 504 includes the portion 516 as the portion 524. For examples, utilizing a machine learning technique as described above with respect to FIG. 4, the processor may determine the portion 516 comprises whispered speech intended for the audience. The processor transmits the audio signal 504.

As described above with respect to FIG. 2, the processor may determine that the command indicates that a first portion of the audio signal preceding the user action and a second portion of the audio signal recorded after the user action may include private speech. In various examples, the first portion of the audio signal may include a fixed time period of the audio signal preceding the user action. In other examples, the time period of the first portion may be a variable time period determined by utilizing a machine learning technique as described above with respect to FIG. 4. In various examples, the second portion of the audio signal may include a fixed time period of the audio signal following the user action, as described above with respect to FIG. 2. In other examples, the user action is a first user action and a duration of the time period of the second portion may be based on a time elapsed between the first user action and a second user action, where the second user action indicates that the audio signal includes normal speech or to unmute the audio input device, as described above with respect to FIG. 3. In some examples, the time period of the second portion may be a variable time period determined by utilizing a machine learning technique as described above with respect to FIG. 4. In various examples, the processor may utilize a combination of the techniques described above.

In some examples, the processor may determine whether the first or the second portions of the audio signal comprise private speech by comparing amplitudes (e.g., power levels) of the first or the second portions, respectively, to a threshold to determine whether the user is whispering, as described above with respect to FIG. 2. In other examples, the processor may determine whether the first of the second portions of the audio signal comprise private speech by utilizing a machine learning technique, as described above with respect to FIG. 4. In various examples, the processor may utilize a combination of the techniques described above.

By identifying portions 508, 510 as private speech from the audio signal 502, the user's experience is improved because the user does not need to locate an interface of the audio input device to mute the audio input device prior to emitting the private speech. By removing portions 508, 510 from the audio signal 504, as illustrated by the filtered portion 522, the user's experience is improved because the processor prevents the transmission of the private speech. The audience's experience is improved because the private speech is not received.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein may be shown in exaggerated scale or in somewhat schematic form, and some details of certain elements may not be shown in the interest of clarity and conciseness. In some of the figures, in order to improve clarity and conciseness, a component or an aspect of a component may be omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:
   an image sensor to detect a user action of a user during a conference between the user and a second person;
   an audio input device to receive an audio signal during the conference, wherein the audio signal includes private speech and non-private speech; and
   a processor coupled to the audio input device and the image sensor, the processor to:
   determine a portion of the audio signal corresponding to the private speech based on the user action;
   remove the portion of the audio signal corresponding to the private speech from the audio signal to produce a filtered audio signal, wherein the filtered audio signal excludes the private speech; and
   transmit the filtered audio signal to the second person.

2. The electronic device of claim 1, wherein the user action includes a hand gesture, a head movement, or a combination thereof.

3. The electronic device of claim 1, wherein the processor is to analyze first and second portions of the audio signal to determine whether the first portion, the second portion, or both the first and the second portions comprise private speech.

4. The electronic device of claim 3, wherein the first portion is a first time period that precedes the user action and wherein the second portion is a second time period that follows the user action.

5. The electronic device of claim 3, wherein the first portion comprises non-private speech and the second portion comprises private speech.

6. An electronic device, comprising:
an audio input device to receive an audio signal during a conference between a user and a second person; and
a processor coupled to the audio input device, the processor to:
receive a command to mute the audio input device;
cause the audio input device to be muted based on the command;
identify a portion of the audio signal that corresponds to private speech based on the command;
remove the portion of the audio signal corresponding to the private speech from the audio signal to produce a filtered audio signal, wherein the filtered audio signal excludes the private speech; and
transmit the filtered audio signal to the second person.

7. The electronic device of claim 6, wherein the command is a user action that is a hand gesture, a head movement, a verbalization, or a combination thereof.

8. The electronic device of claim 7, wherein the command includes the verbalization and wherein the processor is to identify the verbalization as the portion of the audio signal that corresponds to private speech.

9. The electronic device of claim 6, wherein the command is a first command and wherein the processor is to identify the portion of the audio signal that corresponds to private speech based on the first command by analyzing the audio signal during a duration of time between the first command and receipt of a second command to unmute the audio input device.

10. The electronic device of claim 6, wherein the private speech comprises speech below 30 decibels (dBs).

11. A non-transitory machine-readable medium storing machine-readable instructions which, when executed by a processor of an electronic device, cause the processor to:
detect a user action of a user via an image sensor during a conference between the user and a second person;
receive an audio signal detected via an audio input device during the conference, wherein the audio signal includes private speech and non-private speech;
determine a portion of the audio signal corresponding to the private speech via a machine learning technique, wherein the detected user action is an input to the machine learning technique;
remove the private speech from the audio signal to produce a filtered audio signal, wherein the filtered audio signal exceeds the private speech; and
transmit the filtered audio signal to the second person.

12. The non-transitory machine-readable medium of claim 11, wherein the machine learning technique comprises long-short term memory (LSTM) neural network, imbalanced learning, Deep Belief Networks (DBNs), or a combination thereof.

13. The non-transitory machine-readable medium of claim 11, wherein the machine-readable instructions, when executed by the processor of the electronic device, cause the processor to utilize the machine learning technique to analyze frequency differences in portions of the audio signal, patterns of energy concentration across the audio signal, differences between energy concentration patterns of the audio signal and energy concentration patterns of non-private speech, differences between energy concentration patterns of the audio signal and energy concentration patterns of background noise, or a combination thereof.

14. The non-transitory machine-readable medium of claim 11, wherein the machine-readable instructions, when executed by the processor of the electronic device, cause the processor to determine that the user action is a command that indicates the audio signal comprises private speech.

15. The non-transitory machine-readable medium of claim 14, wherein the machine-readable instructions, when executed by the processor of the electronic device, cause the processor to determine that the user action is the command by analyzing a first portion of the audio signal preceding the user action and a second portion of the audio signal following the user action.

* * * * *